(12) United States Patent
Recchia et al.

(10) Patent No.: US 8,433,460 B1
(45) Date of Patent: Apr. 30, 2013

(54) ONBOARD SENSOR SUITE FOR DETERMINING PROJECTILE VELOCITY

(75) Inventors: Thomas Recchia, Succasunna, NJ (US);
Wilfredo Toledo, Hasbrouck Heights, NJ (US); Jason Cahayla, West Miliford, NJ (US); Eric Scheper, Mt. Arlington, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 363 days.

(21) Appl. No.: 12/943,214

(22) Filed: Nov. 10, 2010

(51) Int. Cl.
*G05D 1/00* (2006.01)

(52) U.S. Cl.
USPC .............. 701/7; 382/103; 701/5; 701/3

(58) Field of Classification Search .......... 701/7, 3; 52/2.11; 29/700; 454/239; 521/107, 116, 521/121; 244/122 A, 122 AE; 382/103
See application file for complete search history.

(56) References Cited

U.S. PATENT DOCUMENTS

| | | | | |
|---|---|---|---|---|
| 3,880,043 A * | 4/1975 | Cox et al. | | 89/1.56 |
| 4,792,903 A * | 12/1988 | Peck et al. | | 701/3 |
| 8,305,071 B2 * | 11/2012 | Frick | | 324/160 |
| 2006/0050929 A1 * | 3/2006 | Rast et al. | | 382/103 |
| 2010/0174426 A1 * | 7/2010 | Turung | | 701/11 |

* cited by examiner

*Primary Examiner* — Behrang Badii
(74) *Attorney, Agent, or Firm* — Michael C. Sachs

(57) ABSTRACT

An onboard sensor suite generally includes two main components: a proximity sensor suite for measuring the projectile muzzle velocity; and a pressure sensor suite for measuring the projectile airspeed. The flight velocity of the projectile can then be estimated with a high degree of accuracy using either the muzzle velocity by itself or the airspeed by itself, or, in a preferred embodiment, by using both the muzzle velocity and the airspeed. The proximity sensor suite includes proximity sensors that are mounted along a projectile body; a wire harness; and an onboard computer or CPU. The pressure sensor suite includes a Pitot pressure transducer and two static pressure transducers that are mounted within the projectile body; a wire harness; and a CPU.

15 Claims, 4 Drawing Sheets

ONBOARD SENSOR SUITE FOR DETERMINING PROJECTILE VELOCITY

GOVERNMENTAL INTEREST

The invention described herein may be manufactured and used by or for the Government of the United States for U.S. Government purposes.

FIELD OF THE INVENTION

The present invention relates in general to the field of munitions. More specifically, this invention relates to onboard sensors and associated method to determine the munition velocity by measuring parameters that are directly related to the munition flight velocity in a continuous manner during flight, without relying on external systems or signals. The onboard sensors predict the projectile position accurately and improve the performance of mid-course trajectory correction.

BACKGROUND OF THE INVENTION

A control system for a projectile often requires a measurement of the projectile velocity, in order to improve the projectile navigation and accuracy. The need for the projectile velocity has become increasingly important due to the desire for accuracy, particularly at longer ranges. Conventional solutions to the measurement of the projectile velocity propose using GPS signals to obtain the projectile velocity and position measurements, as well as using Doppler measurements.

Projectile flight velocity estimates are conventionally used for navigation or fuzing purposes. These estimates are typically processed from accelerometer measurements, which could lead to measurement bias errors in the velocity estimates.

Although the conventional solutions have proven to be satisfactory, they are faced with certain limitations. As an example, GPS measurements cannot be used for all applications since some projectiles might not be readily equipped with GPS. More specifically, using GPS measurements for a projectile might be unacceptable for at least the following two reasons: First, if the projectile is not already equipped with GPS capability, fitting an entirely new, typically complicated GPS system, into the existing design might be problematic. Second, it might be desirable to maintain the projectile guidance capability in the absence of GPS measurements.

As another example, Doppler radar measurements might be limited to certain types of projectiles. More specifically, using a Doppler radar might in certain circumstances be unsatisfactory, particularly if the projectile is not equipped with a radar seeker, or if the projectile does not have sufficient capability or physical space to enable the addition of a new radar seeker. In addition, it might be desirable to maintain a passive, non-RF (non-radio frequency) emitting design.

What is therefore needed is an onboard sensor suite that is capable of determining the munition muzzle velocity without modification to the gun system, and that is further capable of accurately determining the in-flight munition velocity independently of GPS measurements. The need for such an onboard sensor suite has heretofore remained unsatisfied.

SUMMARY OF THE INVENTION

The present invention satisfies this need, and presents an onboard sensor suite for long range precision performance of munitions, such as guided projectiles. The onboard sensor suite is integrated in a projectile to measure the projectile airspeed, in order to estimate its velocity. Based on the estimated velocity, the onboard sensor suite predicts the projectile position accurately and improves the performance of mid-course trajectory correction.

A feature of the present onboard sensor suite is its relatively small footprint and readily adaptable operation and simple construction that does not require moving parts.

Another feature of the present onboard sensor suite is that it allows the munition (or projectile) to passively self-measure its muzzle velocity at tube exit and its airspeed (or in-flight velocity) in a continuous manner during its in-flight trajectory, in order to estimate the projectile in-flight velocity.

Still another feature of the present onboard sensor suite is its independence of external data inputs from external data systems, such as GPS.

To this end, the present onboard sensor suite generally includes a proximity sensor suite for measuring the projectile muzzle velocity, and a pressure transducer sensor suite for measuring the projectile airspeed, in order to estimate the flight velocity of the projectile.

The advantages of the present onboard sensor suite are numerous, among which are the following. The onboard sensor suite provides passive measurements without emitting RF signals and without relying on external signals, such as GPS satellite signals, thus avoiding enemy notification of incoming projectiles. Since the onboard sensor suite is independent from GPS measurements, it is not affected by GPS jamming, by for example, enemy combatants. The onboard sensor suite is relatively small in size and simple to operate, in that it does not include moving parts.

The onboard sensor suite begins providing projectile velocity estimates within fractions of a second of muzzle exit. This presents an advantage over conventional systems in that GPS systems require a convergence time on the order of several seconds to start providing projectile velocity estimates, which is often a large percentage of the total flight time.

Furthermore, the estimates obtained from the onboard sensor suite are updated as fast as the onboard processor can read the analog pressure sensors, which can be on the order of 1 kHz or faster. GPS systems currently provide estimates at a rate of about 1 Hz. Faster updates are advantageous to the system using the estimates, in that it allows for more sophisticated signal processing to occur in a reasonable amount of time.

The onboard sensor suite generally includes at least one of the following two main components: a proximity sensor suite for measuring the projectile muzzle velocity and a pressure sensor suite for measuring the projectile airspeed. The flight velocity of the projectile can then be estimated with a high degree of accuracy, using either the muzzle velocity by itself, the airspeed by itself, or, in a preferred embodiment, by using both the muzzle velocity and the airspeed.

To this end, the proximity sensor suite includes proximity sensors that are mounted along a projectile body; a wire harness; and an onboard computer or CPU. The proximity sensor suite can be employed on munitions that are either provided with a guidance system or on munitions that are not provided with a guidance system. This proximity sensor suite helps air bursting munitions to have more accurate fuze airburst times.

The pressure sensor suite includes a Pitot pressure transducer and two static pressure transducers that are mounted within the projectile body, a wire harness, and a CPU. The pressure sensor suite determines in-flight munition velocity and therefore it can be integrated in various munitions with guidance systems.

The onboard sensor suite that integrates both the proximity sensor suite and the pressure sensor suite provides an overall velocity profile to munition control systems for more accurate function. These munition control systems include for example, guidance, fuzing, and in-flight data link updates.

BRIEF DESCRIPTION OF THE DRAWINGS

The various features of the present invention and the manner of attaining them will be described in greater detail with reference to the following description, claims, and drawings, where in reference numerals are reused, where appropriate, to indicate a correspondence between the referenced items, and wherein:

It should be understood that the sizes of the different components in the figures might not be in exact proportion, and are shown for visual clarity and for the purpose of explanation.

DETAILED DESCRIPTION OF PREFERRED EMBODIMENTS

Figure 1:
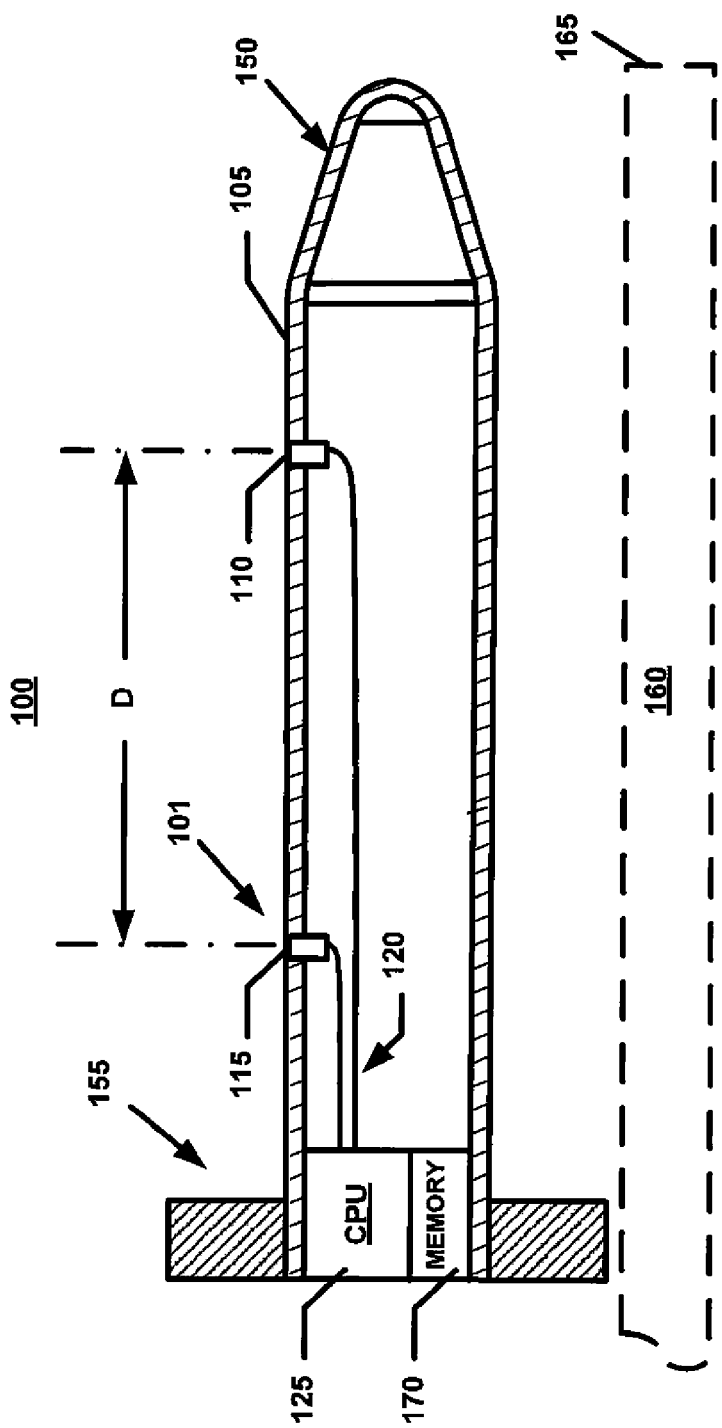
FIG. 1 is a cross-sectional view of a projectile which incorporates an onboard sensor suite that includes a proximity sensor suite (or system) according to one embodiment of the present invention.

FIG. 1 portrays an exemplary projectile 100 which includes an onboard proximity sensor suite 101, a body 105, a nose or forward section 150, and an aft section 155. The shape and design of the projectile 100 that is illustrated in FIG. 1 is merely for illustration purpose. It should be understood that the present invention could be incorporated as part of projectiles or munitions with different shapes and designs.

According to a preferred embodiment of the present invention, the proximity sensor suite 101 measures the velocity of the projectile 100 as it exits a weapon muzzle 160 (shown in dashed lines). This velocity is referred to herein as projectile muzzle velocity.

The proximity sensor suite 101 generally includes a plurality of proximity sensors 110, 115 that are disposed along the projectile body 105. The proximity sensor suite 101 further includes a wire harness 120 that connects the proximity sensors 110, 115 to a central processing unit (CPU) or computer 125.

While the present embodiment of the proximity sensor suite 101 is illustrated with two proximity sensors 110, 115, it should be understood that the proximity sensor suite 101 could be provided with more than two proximity sensors that are capable of measuring the projectile muzzle velocity according to the present invention.

The proximity sensors 110, 115 are preferably mounted onto the projectile body 105, so that they are disposed in close proximity to the muzzle 160 from which the projectile 100 exits. The proximity sensors 110, 115 are spaced apart by a predetermined distance, D.

Each proximity sensor, 110, 115 independently detects its own exit from the muzzle 160. In one embodiment, each sensor 110, 115 uses electromagnetism to defect a forward tip or edge 165 of the muzzle 160. The exit or egress time for each proximity sensor 110, 115 is recorded by the CPU 125.

Figure 2:
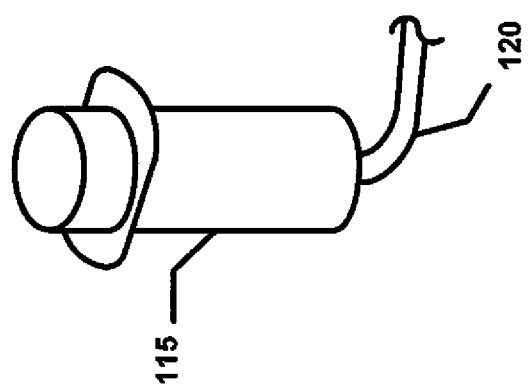
FIG. 2 is an enlarged view of proximity sensor that forms part of the proximity sensor suite of FIG. 1.

With further reference to FIG. 2, each proximity sensor, such as the representative proximity sensor 115, is connected to the CPU 125 by means of a wire harness 120. The wire harness 120 carries the information from the proximity sensors 110, 115 to the CPU 125.

The proximity sensor, i.e., 115 can be formed, for example, by a magnetic core and a coil of electrical wire that is wrapped around the magnetic core. The magnetic field generated by the proximity sensor 115 is affected by the ferrous (or metallic) composition of the gun muzzle 160. The proximity sensor 115 senses changes in the magnetic field as it moves past the forward edge 165 of the muzzle 160.

While the CPU 125 is illustrated as being mounted in the aft section 155 of the projectile 100, it should be understood that the CPU may alternatively be disposed at other suitable locations within the projectile 100.

In operation, the distance, D, between the proximity sensors 110, 115 is stored in a memory or storage device 170, along with the exit time ($t_1$, $t_2$) of each sensor 110, 115. The CPU 125 calculates the average velocity, V, of the projectile 100, by dividing the distance, D, by the difference in exit time, $\Delta t$, where $\Delta t = t_2 - t_1$.

This average projectile velocity, V, is substantially close to, and is approximated to the muzzle projectile velocity. The muzzle projectile velocity, V, can be used to initialize the guidance and navigation algorithms for the projectile 100, in order to estimate the projectile states during flight.

Figure 3:
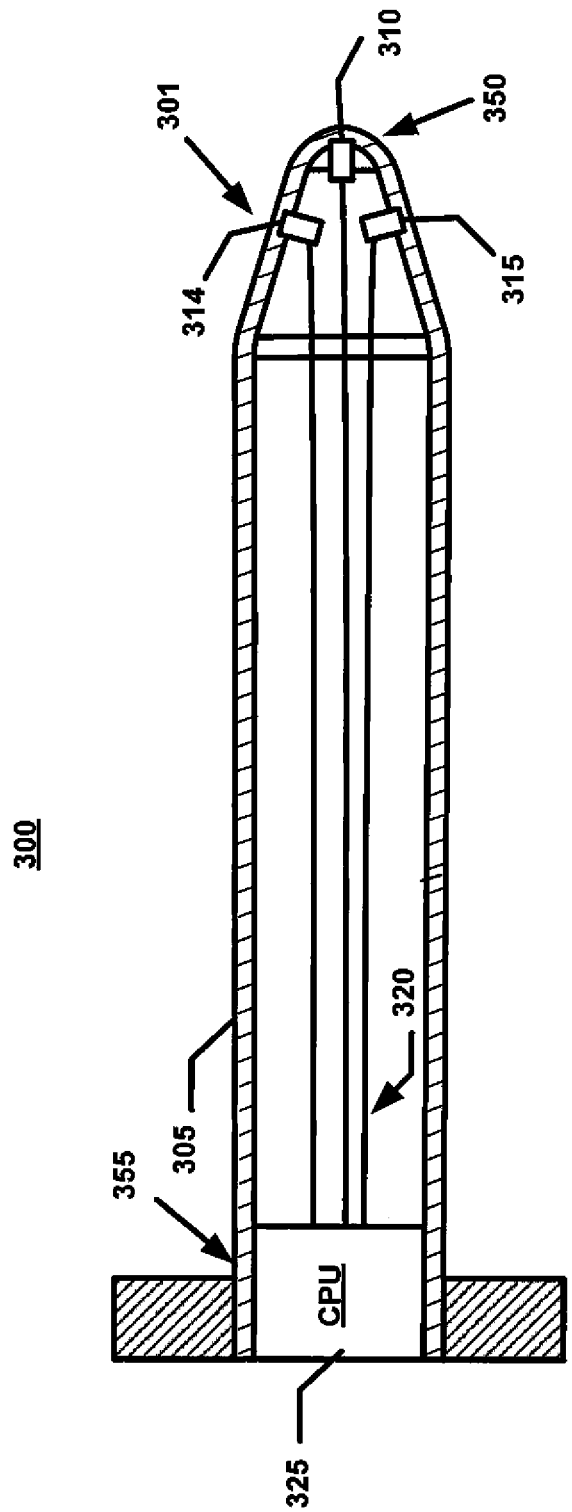
FIG. 3 is a cross-sectional view of a projectile which incorporates an onboard sensor suite that includes a pressure sensor suite (or system) according to another embodiment of the present invention.

FIG. 3 portrays another exemplary projectile 300 which includes an onboard sensor suite 301, a body 305, a nose or forward section 350, and an aft section 355. The shape and design of the projectile 300 that is illustrated in FIG. 3 is merely for illustration purpose.

According to a preferred embodiment of the present invention, the sensor suite 301 measures the airspeed of the projectile 300, in order to estimate the flight velocity of the projectile 300 during flight. This allows the sensor suite 301 to predict the position of the projectile 300 more accurately, and to improve the performance of mid-course trajectory correction.

The pressure sensor suite 301 generally includes a plurality of pressure sensors 310, 314, 315 that are preferably disposed in the nose 350 of the projectile 300; and a wire harness 320 that connects the pressure sensors 310, 314, 315 to a central processing unit (CPU) or computer 325.

While the present embodiment of the sensor suite 301 is illustrated with three pressure sensors 310, 314, 315, it should be understood that the sensor suite 301 could be provided with a different number of pressure sensors that are capable of measuring the projectile airspeed. As an example, one static pressure transducer 314 could be used with one Pitot pressure transducer 310, although such embodiment might introduce some error resulting from the projectile angle of attack.

In the preferred embodiment illustrated herein, the pressure sensors 310, 314, 315 include one Pitot pressure transducer 310 and two static pressure transducers 314, 315. The Pitot pressure transducer 310 is preferably disposed at the forwardmost tip of the projectile nose 350, and measures the total air pressure at the projectile nose 350. According to a preferred embodiment of the present invention, the Pitot pressure transducer 310 is located along a longitudinal, central axis of symmetry of the projectile 300.

While one Pitot pressure transducer 310 is illustrated herein, it should understood that a different pressure transducer that measures the total air pressure at the projectile nose 350, may be used. The measured air pressure is transmitted to the CPU 325 via the wire harness 320. According to another embodiment, one or more Pitot pressure transducers 310 may be disposed at different locations within the projectile nose 350.

While two static pressure transducers 314, 315 are illustrated herein, it should be understood that a different number and types of pressure transducers may be used to measure the static pressure of air, at the nose section that is located, rearward, and in proximity to the forwardmost tip of the projectile nose 350. According to a preferred embodiment of the present invention, the two static pressure transducers 314, 315 are located symmetrically relative to the longitudinal, central axis of symmetry of the projectile 300.

Each of the two static pressure transducers measures the air pressure exerted at its corresponding location. The data collected by the two static pressure transducers 314, 315 is transmitted to the CPU 325 via the wire harness 320. The data is averaged by the CPU in order to compensate for the projectile's angle of attack.

The resulting air pressure average is then compared with the air pressure at the projectile nose 350 that is measured by the Pitot pressure sensor 310. The relationship between the average static air pressure, P, and the Pitot air pressure at the forwardmost tip of the projectile nose 350, $P_0$, is directly related to the velocity of the projectile, as it will be explained later in more detail.

The ratio of the average static air pressure, P, and the Pitot air pressure, $P_0$, is can be related to the free stream Mach number of the projectile 300. The CPU 325 performs the necessary calculations to estimate the projectile airspeed.

A subsonic flow relationship and a supersonic flow relationship exist between the average static air pressure, P, the Pitot air pressure, $P_0$, and the free stream Mach number of the projectile 300, are described below.

The subsonic flow relationship is illustrated by the following equation:

$$\frac{Po}{P} = \left(1 - M^2 \frac{\gamma - 1}{2}\right)^{\frac{\gamma}{\gamma - 1}}$$

where M represents the Mach number and γ is a constant that equals 1.4 for air.

Using the foregoing subsonic equation, the CPU 325 calculates the Mach number, M, between the bow shock wave and the nose of the projectile for supersonic freestream conditions and the freestream Mach number, M, for subsonic freestream conditions.

The supersonic flow relationship is illustrated by the following equation:

$$M_{inf} = \left[\frac{\left(1 + M^2 \frac{\gamma - 1}{2}\right)}{\gamma M^2 - \frac{\gamma - 1}{2}}\right]^{0.5}$$

For supersonic freestream conditions, using the foregoing supersonic equation, the CPU 325 calculates the free stream Mach, $M_{inf}$. The CPU 325 thus continuously calculates the projectile airspeed, A, according to the present equation:

$$A = M_{inf} \times \text{Speed of sound in air,}$$

assuming the temperature of the air is known a priori.

Figure 4:
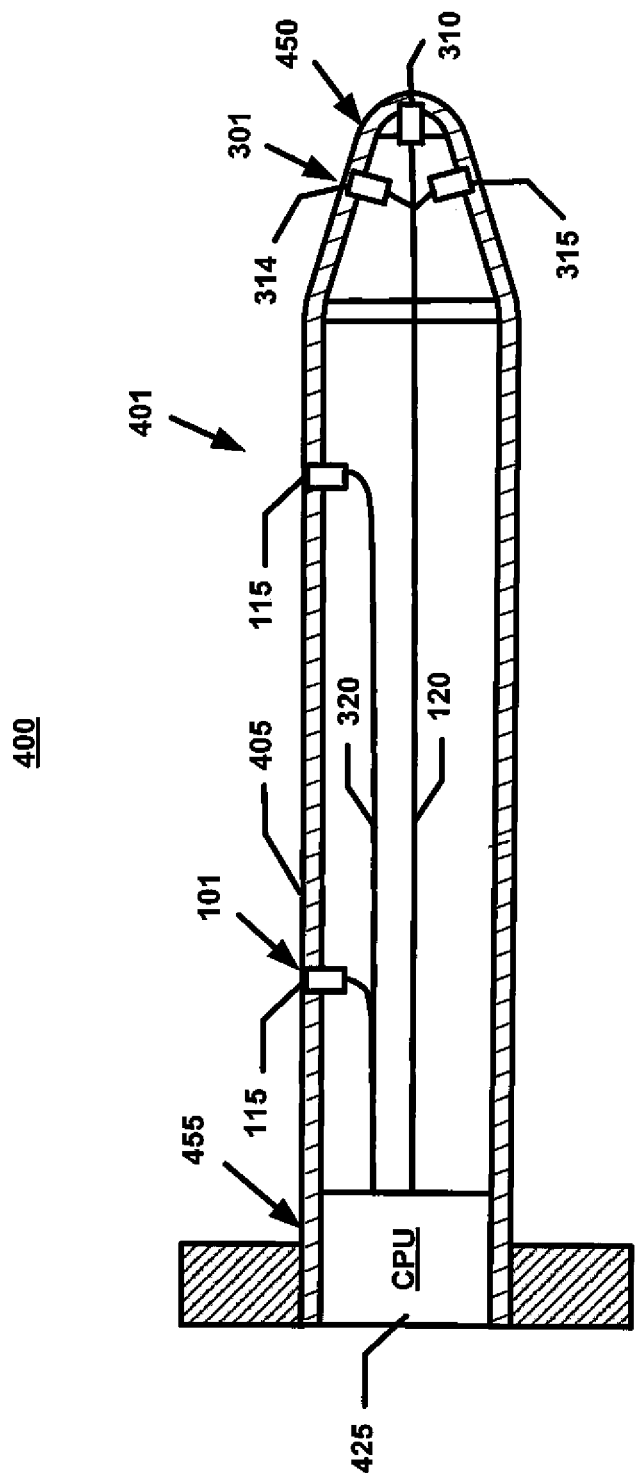
FIG. 4 is a cross-sectional view of a projectile which incorporates an onboard sensor suite that includes a combination of the proximity sensor suite of FIG. 1, and the pressure sensor suite of FIG. 3, according to still another embodiment of the present invention.

FIG. 4 portrays an exemplary projectile 400 which includes an onboard sensor suite 401, a body 405, a nose or forward section 450, and an aft section 455. The shape and design of the projectile 400 that is illustrated in FIG. 4 is merely for illustration purpose.

According to a preferred embodiment of the present invention, the sensor suite 401 includes a combination of a proximity sensor suite 101 that has been described in connection with FIG. 1, and a pressure sensor suite 301 that has been described in connection with FIG. 3.

The proximity sensor suite 101 (FIG. 1) measures the projectile muzzle velocity, while the pressure sensor suite of the pressure sensor suite 301 measures the airspeed of the projectile 400, in order to estimate the flight velocity of the projectile 400 during flight. This allows a CPU 425, which performs the functions of the CPUs 125 and 325, to predict the position of the projectile 400 more accurately, and to improve the performance of mid-course trajectory correction.

As explained earlier, the projectile muzzle velocity is the velocity the projectile has at muzzle exit. The projectile muzzle velocity can be used to initialize the navigation algorithms contained on the CPU 425. The airspeed is equal to the velocity of the projectile 400 minus the velocity of the wind that the projectile 400 is flying through. Its measurement can be used by the CPU 425 to update the estimate of the velocity of the projectile 400 throughout flight. Since the CPU 425 has an estimate of its velocity during flight, it can use that information in another part of the guidance algorithms to direct the projectile 400 in how it needs to maneuver to get to its intended target location.

The present onboard sensor suite 401 can be used in a projectile 400 that has at least some of the following characteristics: fired from a ferrous tube (usually steel); requires a muzzle velocity estimate, in that some projectiles do not rely on muzzle velocity measurements for their navigation, which projectiles might not benefit totally from the muzzle velocity measurement; requires a continuous airspeed measurement over a large portion of the trajectory, in that some projectiles do not rely on velocity measurements for navigation, which projectiles might not benefit totally from the airspeed measurement; cannot use GPS, or requires a redundant system to improve performance when jammed; cannot modify the gun tube; or cannot broadcast ground measurements.

It should be understood that the geometry, compositions, values, and dimensions of the components described herein can be modified within the scope of the invention and are not intended to be the exclusive. Other modifications can be made when implementing the invention for a particular environment.

What is claimed is:

1. An onboard sensor suite for use in a projectile that includes a body, a forward section, and an aft section, the onboard sensor suite comprising:

a proximity sensor suite that is integrated in the projectile, and that measures a projectile muzzle velocity, V, as the projectile exits a weapon muzzle;

wherein the proximity sensor suite includes a plurality of proximity sensors that are integrated in the projectile and that independently defect egress times of the plurality of proximity sensors from the weapon muzzle;

wherein the plurality of proximity sensors transmit the egress times to a central processing unit that is integrated in the projectile, and wherein the central processing unit calculates the projectile muzzle velocity, V, by dividing a distance, D, that separates the plurality of proximity sensors by a difference in the egress times;

a pressure sensor suite that is integrated in the projectile, and that measures an airspeed of the projectile, A, in order to estimate a flight velocity of the projectile during flight, and to predict a projectile position for improving mid-course trajectory correction;

wherein the pressure sensor suite includes a plurality of pressure sensors that are integrated in the projectile, that measure a total air pressure at one location of the projectile forward section, and that further measure a static air pressure at another location of the projectile forward section; and wherein the central processing unit calculates the projectile flight velocity by comparing the total air pressure and the static air pressure.

2. The onboard sensor suite of claim 1, wherein the plurality of proximity sensors include two proximity sensors.

3. The onboard sensor suite of claim 2, wherein the two proximity sensors are disposed along the projectile body.

4. The onboard sensor suite of claim 3, wherein each proximity sensor detects the egress time from the weapon muzzle by electromagnetically detecting a forward edge of the weapon muzzle.

5. The onboard sensor suite of claim 1, wherein the proximity sensor suite further includes a wire harness that connects the plurality of proximity sensors to the central processing unit.

6. The onboard sensor suite of claim 1, wherein the plurality of proximity sensors are mounted onto the projectile body, in close proximity to weapon the muzzle from which the projectile exits.

7. The onboard sensor suite of claim 1, wherein the central processing unit is mounted in the projectile aft section.

8. The onboard sensor suite of claim 1, wherein the pressure sensor suite further includes a wire harness that connects the plurality of pressure sensors to the central processing unit.

9. The onboard sensor suite of claim 1, wherein the plurality of pressure sensors include a Pitot pressure transducer.

10. The onboard sensor suite of claim 9, wherein the Pitot pressure transducer is located along a longitudinal, central axis of symmetry of the projectile.

11. The onboard sensor suite of claim 9, wherein the plurality of pressure sensors include two static pressure transducers that are disposed at different locations along the projectile forward section.

12. The onboard sensor suite of claim 11, wherein the central processing unit calculates an average static pressure, P, by averaging the static air pressure measured by each of the two static pressure transducers, in order to compensate for an angle of attack of the projectile; and wherein the central processing unit calculates the projectile flight velocity by comparing the average static air pressure and the total air pressure, $P_0$.

13. The onboard sensor suite of claim 11, wherein the central processing unit calculates the projectile flight velocity by determining a flow relationship between the average static air pressure, P, the total air pressure, $P_0$, and a free stream Mach number, M, of the projectile.

14. The onboard sensor suite of claim 13, wherein the flow relationship includes a subsonic flow relationship that is illustrated by the following equation:

$$\frac{P_o}{P} = \left(1 - M^2 \frac{\gamma-1}{2}\right)^{\frac{\gamma}{\gamma-1}}$$

where $\gamma$ is a constant that equals 1.4 for air.

15. The onboard sensor suite of claim 13, wherein the flow relationship includes a supersonic flow relationship that is illustrated by the following equation:

$$M_{inf} = \left[\frac{\left(1 + M^2 \frac{\gamma-1}{2}\right)}{\gamma M^2 - \frac{\gamma-1}{2}}\right]^{0.5}$$

where $\gamma$ is a constant that equals 1.4 for air; and wherein the central processing unit calculates a free stream Mach, $M_{inf}$, and further continuously calculates the projectile airspeed, A, according to the present equation:

$A = M_{inf} \times$ Speed of sound in air.

* * * * *